(12) United States Patent
Kaltenbach et al.

(10) Patent No.: US 8,475,330 B2
(45) Date of Patent: Jul. 2, 2013

(54) METHOD AND DEVICE FOR CONTROLLING A CREEP MODE OF A VEHICLE HAVING A HYBRID DRIVE SYSTEM

(75) Inventors: Johannes Kaltenbach, Friedrichshafen (DE); Kai Bornträger, Langenargen (DE); Stefan Wallner, Mattsee (AT); Christian Mittelberger, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 355 days.

(21) Appl. No.: 12/747,143

(22) PCT Filed: Dec. 2, 2008

(86) PCT No.: PCT/EP2008/066577
§ 371 (c)(1),
(2), (4) Date: Oct. 29, 2010

(87) PCT Pub. No.: WO2009/074480
PCT Pub. Date: Jun. 18, 2009

(65) Prior Publication Data
US 2011/0039655 A1     Feb. 17, 2011

(30) Foreign Application Priority Data

Dec. 13, 2007 (DE) .......................... 10 2007 055 787

(51) Int. Cl.
*B60W 10/02* (2006.01)
(52) U.S. Cl.
USPC ............................................................ 477/5
(58) Field of Classification Search
USPC ............. 477/5, 174, 180; 180/65.245, 65.265
See application file for complete search history.

(56) References Cited

U.S. PATENT DOCUMENTS 6,808,470 B2   10/2004  Boll 7,644,790 B2   1/2010  Roske et al.
(Continued)

FOREIGN PATENT DOCUMENTS

DE         10158536 A1      7/2003
DE     102005051382 A1      5/2007
(Continued)

OTHER PUBLICATIONS

International Search Report for International Application No. PCT/EP2008/066577, dated Mar. 23, 2009, 2 pages.
Written Opinion of the International Searching Authority for International Application No. PCT/EP2008/066577, dated Mar. 23, 2009, 6 pages.
(Continued)

*Primary Examiner* — Roger Pang
(74) *Attorney, Agent, or Firm* — Brinks Hofer Gilson & Lione

(57) ABSTRACT

The invention relates to a method and a device for controlling a creep mode of a vehicle having a hybrid drive system (1, 1'), having a parallel hybrid drivetrain (2, 2') comprising an internal combustion engine (3), at least one electrical machine (5), a first switching element (4) designed as a frictional element and disposed between the internal combustion engine (3) and the electrical machine (5), by means of which the internal combustion engine (3) can be connected to the electrical machine (5), a gearbox (7), an output (26), and at least one second switching element (6) designed as a frictional element and disposed between the electrical machine (5) and the output (26), by means of which the electrical machine (5) can be operationally connected to the output (26). In order to allow low-cost, effective long-term creeping that is gentle on the components, and thereby ensures reliable availability of electrical energy for electrical loads of the vehicle, the creep mode is alternately implemented by an internal combustion engine creep mode generated by means of operating at least one switching element (6, 27) in slip, and an electrical motor creep mode at least supported by means of the electrical machine (5).

20 Claims, 2 Drawing Sheets

U.S. PATENT DOCUMENTS

Figure 1:
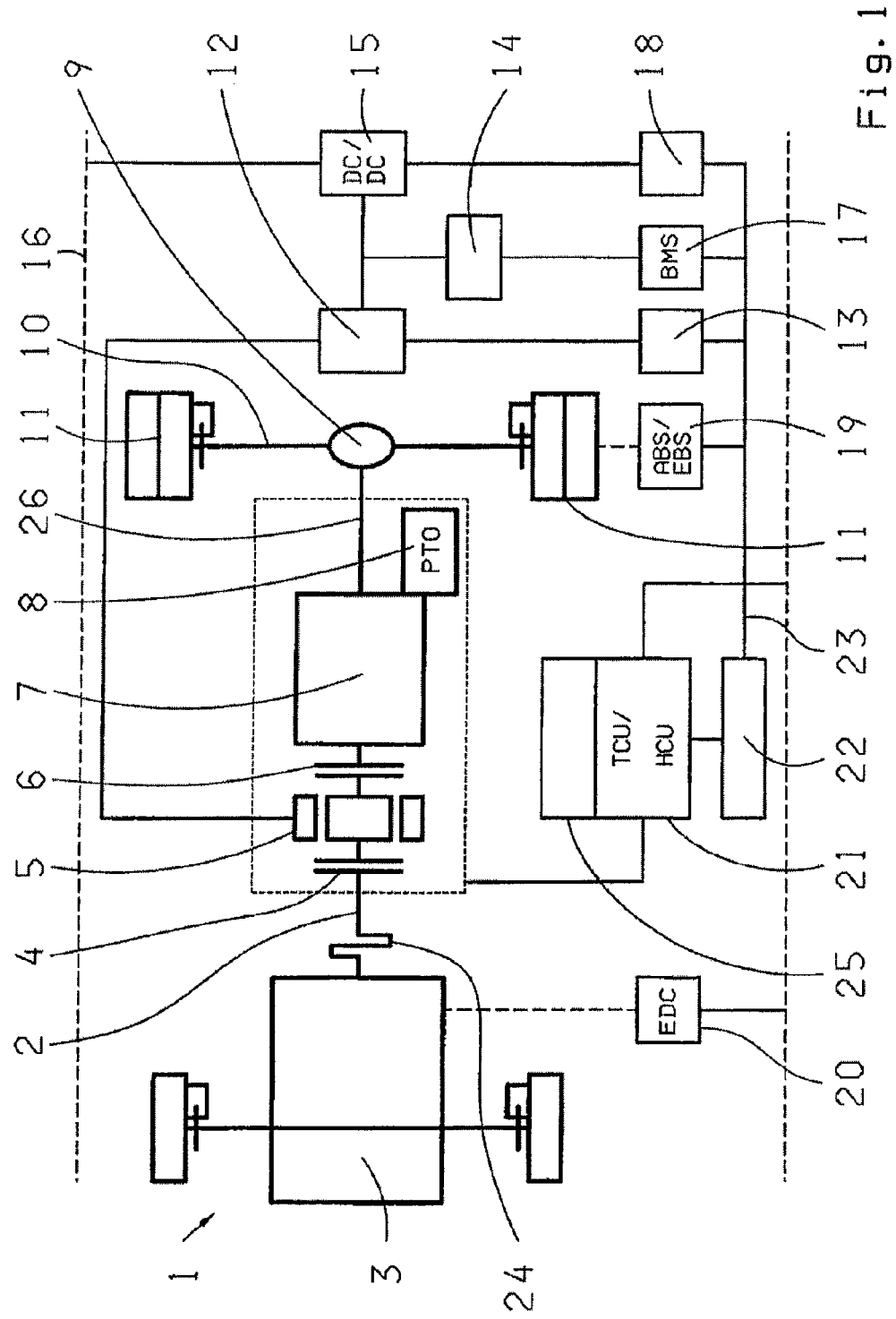

| | | | |
|---|---|---|---|
| 7,878,281 B2* | 2/2011 | Tanishima | 180/65.265 |
| 7,892,139 B2* | 2/2011 | Kaltenbach | 477/5 |
| 8,065,047 B2* | 11/2011 | Hasegawa et al. | 701/22 |
| 2003/0153429 A1 | 8/2003 | Boll | |
| 2005/0221947 A1 | 10/2005 | Mesiti et al. | |
| 2006/0272869 A1 | 12/2006 | Hidaka et al. | |
| 2007/0272456 A1* | 11/2007 | Shiiba | 180/65.2 |
| 2007/0275819 A1* | 11/2007 | Hirata | 477/5 |
| 2007/0278022 A1* | 12/2007 | Tanishima | 180/65.2 |
| 2008/0058154 A1* | 3/2008 | Ashizawa et al. | 477/5 |

FOREIGN PATENT DOCUMENTS

| | | |
|---|---|---|
| EP | 1731802 A | 12/2006 |
| EP | 1862364 A | 12/2007 |

OTHER PUBLICATIONS

International Preliminary Report on Patentability for International Application No. PCT/EP2008/066577, dated Jul. 6, 2010, 7 pages.

* cited by examiner

METHOD AND DEVICE FOR CONTROLLING A CREEP MODE OF A VEHICLE HAVING A HYBRID DRIVE SYSTEM

This application is a filing under 35 U.S.C. §371 of International Patent Application PCT/EP2008/066577, filed Dec. 2, 2008, which claims priority to German Application No. 10 2007 055 787.8, filed Dec. 13, 2007, each of which is incorporated by reference herein in its entirety.

The invention concerns a process and a device for controlling a creep mode of a vehicle with a hybrid engine.

Hybrid engines are becoming increasingly significant in the motor vehicle industry due to their potential for decreasing exhaust emissions and energy consumption. These types of vehicles have a variety of power sources, whereby in particular, combinations of internal combustion engines and electric motors have an advantage, as on the one hand they have the long range capacity and performance advantages of internal combustion engines, and on the other hand are able to make use of the flexible application possibilities of electric machines as the sole or supplementary power source or as starter generator as well as a generator for power and recuperation.

The market demands of hybrid power trains that they be able to be implemented in the vehicle with as little additional space requirements as possible, be as uncomplicated as possible and that they are inexpensive and have a simple construction. For this, there are basically two hybrid designs, the serial hybrid and the parallel hybrid. Configurations of this sort are already known, and are constantly being improved.

With a serial hybrid, the engines are in a sequential circuitry. In this case, an internal combustion engine, such as a diesel motor, serves as the power source for a generator, which feeds an electric machine. The vehicle is thereby powered solely by the electric machine. The internal combustion engine, on the other hand, is disengaged from the driving wheels and can therefore be driven constantly at a single operating state, i.e. at a specific torque with a constant rotational speed. This power concept is ideal, for example, with busses in urban traffic, driving short distances, whereby ideally it can be adjusted to an operating state, whereby the efficiency of the internal combustion engine is as high as possible, while simultaneously the exhaust emissions, fuel use and noise levels are at a reasonable level. In contrast, the disadvantage is that the efficiency of the power train is limited due to the multiple mechanical-electrical conversions.

In comparison, the parallel hybrid drive train offers, aside from overlapping the drive torque distribution, the option of driving with pure internal combustion engine power or pure electrical motor power through a parallel configuration of the power sources in respect to the power flow. With a parallel hybrid, the internal combustion engine can functionally be operated at an optimal torque for the most part through respective loading or support from one or more electric machines, such that the maximum efficiency of the internal combustion engine may be effectively used. The electric support of the internal combustion engine decreases the amount of fuel consumption. Because, whereby for short elevated performance requirements in the so-called boost mode, for example when passing, it is possible to combine the power of the two, the internal combustion engine can be constructed such that it is smaller, lighter, and requires less space without loss to the performance and driving comfort of the vehicle, which additionally reduces emissions and is more economical. The electric machine can also function as an integrated start generator for starting the internal combustion engine via a clutch. Furthermore, the electric machine may be used to charge an electric energy storage unit when in the generator mode, and for recuperation while stopped. As a rule, any vehicle transmission may be used for variation of gear transmission ratios of the shafts powered by drive train.

With a parallel hybrid power train, the drive propulsion system of the vehicle can be frequently changed from an internal combustion engine, electric motor and a mixture thereof, depending on the respective hybrid operating strategy. The alternating engagement of the electric motor and the internal combustion engine in the drive train is for the most part accomplished with clutches. For this, two-clutch (2K) configurations and one-clutch (1K) configurations are distinguished, whereby with both concepts the electric machine can function as an integrated starter generator (2K-ISG or 1K-ISG configuration). With a 2K-ISG drive train, such as is known from the US 2005 022 1947 A1, the internal combustion engine can be connected to the electric machine through a first clutch. The electric machine can then be coupled to a vehicle transmission through a separate second clutch. With a 1K-ISG drive train, such as is known from the DE 10 2005 051 382 A1, the second separate clutch is omitted between the electric machine and the transmission or respectively, the output. The electric machine can thereby be directly connected to the input of the transmission. The function of an optional second clutch between the electric machine and the output, insofar as this is intended or necessary for the respective drive concept, can be assumed by, where applicable, existing transmission-internal geared clutches and/or geared brakes such as are used in automatic transmissions, or by a, where applicable, an torque converter lock-up clutch upstream of the transmission.

Furthermore, it is known that in vehicles with automated transmissions, or automatic transmissions, a creep mode is implemented in order to increase driving comfort and reliability. For this, a creep torque is transmitted by the drive train to the output or, respectively, the actuated vehicle wheels, which can be adjusted to a predetermined characteristic value or curve. In this operating state the vehicle moves, when the gears are engaged, the brake is not engaged, and the gas pedal is not activated, at a very slow rate. On inclines, by using a creep mode it is also possible to stop the vehicle for a limited period of time.

A creep mode can be implemented and regulated in a variety of ways in the drive train depending on the power train concept. With conventional vehicles having an automated manual transmission and an automatic friction connection starting clutch, the creep mode may be realized through a corresponding activation of the starting clutch. With other conventional vehicles having automatic transmissions and a hydrodynamic torque converter, a creep torque generated by the converter is determined basically by the idle speed of the internal combustion engine. With hybrid or electric vehicles, as an alternative to conventional friction clutches or hydrodynamic converters, an existing electric drive mechanism may also be used to generate a creep mode.

An electric creep mode of this sort basically has the advantage over drive trains with a friction clutch whereby a creep torque is established through slippage, that there is less mechanical loss in the transference of power. Furthermore, there is no danger of overheating the clutch. From this it would appear that with a hybrid vehicle a purely electrical creep using the electric machine is similar to an internal combustion engine running at idle, decoupled from the drive train.

For this, it is problematic that the electric drive energy storage unit of the hybrid vehicle can be drained in a relatively short period of time as a result of the operation of the electric machine, such that the electric creep mode must be interrupted or cut short, in order to charge the energy storage unit in the generator mode of the electric machine. The electric machine would then temporarily be unavailable, or available on a limited basis for powering the vehicle. An electric long term creep is therefore less advantageous. On the other hand, with a long term creep using a slipping clutch, a high rate of performance loss may occur to said, which requires a corresponding construction size, with an increased demand on installation space, and additional weight as well as requiring relatively intensive cooling measures.

From the DE 101 58 536 B4, a motor for an electric or hybrid vehicle is known, whereby a creep mode is realized using an electric power engine. In the drive train of the vehicle, a clutch device is located between the electric machine and an output. The clutch device may, for example, consist of a converter lock-up clutch using a friction clutch, having an upstream automatic transmission. Alternatively, one or more geared clutches and/or geared brakes of an automatic transmission may function as said clutch device. In order to reduce the thermal load to the electric machine in creep mode when a high torque is required, for example when the vehicle is creeping or stopped on an incline, or when driving over a curb, while at the same time avoiding the need for a larger size electric machine and/or clutch apparatus, it is possible, if desired, to operate a clutch of the clutch device downstream of the electric machine with slippage. If there are multiple clutches in the clutch device, then they can be operated in slippage alternately or cumulatively. Should the electric machine have two separate coils, these may be operated in a constant alternating state. Through a combination of these means or measures, a thermal overload to the clutch device as well as the electric machine during periods of high torsion at very low speeds or long periods where the vehicle remains stationary may be avoided.

A disadvantage with this is that the electric machine is constantly running for a relatively long period of time during an extended creep phase. The electric machine can be supported, however, by the transmission end clutch device and/or by the multiple coils which can be alternately activated. The relatively intensive stress to the electric drive energy storage unit of the electric machine may, as a result, significantly limit an extended creep phase of this sort. An electric machine with numerous separate coils can also be relatively expensive. Furthermore, completely forgoing the internal combustion engine during an extended creep phase with a hybrid engine is rather ineffective.

With this background information, the invention has the underlying task of producing a process and a device for controlling a creep mode of a vehicle with a hybrid engine, which allows for an economical, effective and component friendly extended creep phase, and thereby providing a reliable availability of electric energy for electronic components of the vehicle.

The solution to this task is accomplished with the characteristics of the independent claims, while advantageous embodiments and further developments of the invention may be derived from the subsidiary claims.

The invention acknowledges the fact that with a hybrid vehicle, an effective and component friendly extended creep mode of a vehicle is enabled by an alternating internal combustion engine creep mode, which is generated through a slippage operation of an available friction clutch, or respectively, friction braking between the electric machine and the output, and an electric motor creep mode, which is generated by an appropriate controlling of the electric machine, during which the friction element is able to cool down, without danger of the clutch, on the one hand, and an electric drive energy storage unit as well as the electric machine, on the other hand, being overloaded, or respectively, taxed to an excessive degree.

Accordingly, the invention is based on a process for controlling a creep mode of a vehicle with a hybrid engine, having a parallel hybrid drive train containing an internal combustion engine, at least one electric machine, a first clutch located between the internal combustion engine and the electric machine in the form of a friction element whereby the internal combustion engine can be connected to the electric machine, a transmission, an output and at least one second clutch in the form of a friction element located between the electric machine and the output whereby the electric machine is functionally connected to the output.

To solve the proposed task, the invention intends that the creep mode be accomplished alternately by an internal combustion engine generated creep mode using at least one clutch in slippage mode and by an electric motor creep mode which is at least supported by the electric machine.

A creep mode of a vehicle having an internal combustion engine and a transmission is understood to be a state where the vehicle, while in gear, and the gas pedal is not being depressed, moves forwards at a very slow rate, or is temporarily stopped, such that a force-locked connection between the internal combustion engine and an output would be accompanied by a loss of speed to the internal combustion engine which is below the idle rate.

A friction element is understood to be a force transferring friction-locked clutch with at least two friction partners, whereby when the clutch is fully engaged, frictional contact is established, and in slippage, a rotation speed difference between the primary and secondary friction partners exists whereby friction is converted to heat.

The given task is also solved by a device for executing the process.

Accordingly the invention comprises a device for controlling a creep mode of a vehicle with a hybrid engine, having a parallel hybrid drive train containing an internal combustion engine, at least one electric machine, a friction element in the form of a clutch located between the internal combustion engine and the electric machine, whereby the internal combustion engine can be connected to the electric machine, a transmission, an output and at least one second friction element in the form of a clutch located between the electric machine and the output whereby the electric machine can be functionally connected to the output.

In addition, control means are available, whereby the creep mode can be realized using alternately the internal combustion engine, by activating at least one clutch in slippage, and at least supported by the electric motor, by means of activating the electric machine.

The second clutch can be constructed as a friction clutch external to the transmission, located between the electric machine and the transmission. It may also be the case that the second clutch, and optional additional clutches available for the creep mode be constructed as friction geared clutches and/or geared brakes within the transmission.

The friction elements are subjected to less stress through the alternating slippage mode of the friction elements and the electric creep mode, because they can intermittently cool down when engaged, such that a comparatively lower permanently reliable clutch temperature is established which allows for a practically unlimited period of creep mode for the vehicle. Furthermore, the electric energy storage unit is not permanently drained, as the electric machine is only temporarily engaged as the power source for the creep mode and can intermittently recharge the power storage unit in the generator mode. Because the creep mode of the electric machine is basically more efficient in comparison with the creep mode of the internal combustion engine using a slipping clutch, there is an overall lower performance loss compared to a creep mode with permanently ongoing clutch slippage. This is particularly the case where the creep mode is such that the vehicle is stationary or nearly stationary, as in this case the potential clutch slippage is particularly large.

In accordance with a preferred embodiment of the invention, during an extended creep mode of the vehicle, alternating cyclically, in a first process step having an engaged first clutch, the electric machine shall be operated as a generator through the internal combustion engine and at least the second clutch operated with slippage, and in a second process step, without a slipping clutch between the electric machine and the output, at least the electric machine will be operated as a motor in order to generate the creep mode.

Accordingly, in the simplest case, the creep mode is realized alternately through a slippage mode of the second clutch, while the first clutch is engaged and through the electric machine while the second clutch is engaged and the first clutch is disengaged. Depending on the drive train configuration, the second clutch thereby can be either a transmission-internal or transmission-external friction clutch or geared brake.

In order to be able to further extend the first process step by relieving the second clutch of its load, at least on additional, third clutch may be incorporated between the electric machine and the output which is operated in slippage mode alternately or jointly with the second clutch. As a result, during the internal combustion engine creep mode, it is possible to dynamically alternate from the second clutch to a third clutch or geared brake which is located between the electric machine and the output. As a rule, it is possible to shift between a transmission-external second clutch and a transmission-internal third clutch or between a transmission-internal second clutch and a transmission-internal third clutch. It is also possible that the second and the third clutch be operated jointly in slippage mode, or that even more than two clutches located between the electric machine and the output be incorporated. It is decisive that with the configuration, or its mode of operation, at least temporarily, a creep mode can be obtained by the clutch within acceptable temperatures for said clutch.

In the second process step the electric machine is operated and the creep mode is obtained through an appropriate activation of the electric machine without clutch slippage between the electric machine and the output. In the simplest case, in this phase a pure electric motor creep mode results from the disengaged first clutch; in other words, when the internal combustion engine is disengaged. The second clutch and, where applicable, additional clutches between the electric machine and the output can cool down during this phase.

In order to extend this phase advantageously as well, in addition to the operation as an electric motor of the electric machine, the first clutch can be operated in slippage mode. As a result, the internal combustion engine can contribute a creep torque to the electric creep mode through the clutch at the internal combustion engine end of the drive train, whereby the electric machine must supply a lower torque and thereby uses less electricity from the energy storage unit. For this, it is understood that a load limit of the clutch is taken into consideration, in order that an overheating of the clutch may not occur.

Furthermore, it is possible for the electric machine to operate in generator mode when there is a priority on electric energy while at the same time the first clutch is operated in slippage mode.

As a rule, it is not good with respect to efficiency and power loss to operate the internal combustion engine clutch in slippage mode while the electric machine is in generator mode, because the slipping clutch must then carry the entire creep torque and the additional necessary load torque. Should however an extraordinary condition occur, whereby an urgent requirement for electrical energy exists in the vehicle, for example with a sudden demand to the internal power supply network, for practical purposes the possibility exists of operating the electric machine in generator mode. In this manner the supply of electric energy to the internal power supply network is ensured at all times and a creep mode over an extended period of time can also be obtained at the same time as a generator mode without a slipping clutch between the electric machine and output.

The shift between the two process steps, in other words between the internal combustion engine creep mode and the electric motor creep mode is obtained depending advantageously on the level of charge in the electric energy storage unit. Accordingly, the internal combustion engine creep mode can be activated when the level of charge in the energy storage unit has sunk below a lower threshold charge level, and the electric motor creep mode can be activated when the level of charge in the energy storage unit has increased to an upper threshold charge level. As a rule, another switching rhythm, for example, through a timer, may also be used. Consideration of further operating parameters for alternating extended creep modes, such as a maximum acceptable value of a monitored clutch temperature, is also possible.

Through alternating the internal combustion engine and electric motor creep modes, on the one hand, relatively high level of constantly available electric energy is made possible, whereby a minimum reserve of energy is ensured, and on the other hand, a creep mode of the hybrid vehicle over an extended period with clutch slippage at a constant acceptable clutch temperature range is obtained.

For clarification of the invention, drawings of embodiment examples accompany the description. They show:

FIG. 1: A schematic presentation of a hybrid electric power train of a vehicle for executing a process in accordance with the invention for controlling a creep mode having a second clutch external to the transmission, and FIG. 2: A schematic presentation of a hybrid electric power train of a vehicle for executing a process in accordance with the invention for controlling a creep mode having a second clutch external to the transmission and a third clutch which is inside the transmission.

Accordingly, FIG. 1 shows a diagram of a vehicle hybrid electric power train 1 with a parallel hybrid drive train 2 as it may be incorporated in a commercial vehicle (truck, bus, special-purpose vehicle). The drive train 2 contains an internal combustion engine 3, such as a diesel engine, with a crankshaft 24, which can be connected to an electric machine 5 by a clutch 4 in the form of a friction clutch. The electric machine 5 in turn, can be connected to a transmission 7 by a second clutch 6 in the form of a friction clutch. The second clutch 6 is located upstream of the transmission in the drive train. The transmission 7, as is indicated in FIG. 1, is downstream of a power take-off (PTO) 8, which is not explained in detail here. A respective applied engine torque of the hybrid electric power train 1 can be transferred to a drive shaft 10 and thereby to the driving wheels 11 by the output 26 and a differential 9.

The electric machine 5 can be used as an electric power engine or as a generator, depending on the operational situation. For this it is connected to a power converter 12, which can be controlled by a power converter control unit 13. The electric machine 5 is connected to an electric drive energy storage unit 14, for example a 340V high voltage battery (supercaps are also possible) through the power converter 12.

When used as a motor, the electric machine 5 is supplied with power from the energy storage unit 14. When used as a generator, in other words while the internal combustion engine 3 is supplying the drive power and/or while in recuperation mode, the energy storage unit 14 is recharged by the electric machine 5. Furthermore, the electric machine 5 functions as an integrated starter generator (ISG) for starting the internal combustion engine 3.

The high voltage circuit of the energy storage unit 14, or respectively, the attached control units are connected to an internal power supply network (24V or 12V) 16 through a bidirectional DC converter (DC-DC) 15. The energy storage unit 14 can be monitored or regulated by a battery management system (BMS) regarding its state of charge (SOC). The DC converter 15 can be controlled by a DC converter control device 18. In addition, a control device 19 may be incorporated for brake regulating functions which are not explained in detail here, in particular for an anti-lock braking system (ABS) or respectively, an electronic braking system (EBS) as well as an additional control device 20 for an electronic diesel regulator (EDR) of the internal combustion engine 3 in the form of a diesel engine, for example. The various individual control devices specified can also, at least in part, be combined in one control device.

Furthermore, there is an integrated controller 21, comprised of a transmission control unit (TCU), a hybrid control unit (HCU) and various operating functions.

The controller 21 is configured as a control means 25 in the form of a control unit for controlling the available clutch elements 4, 6 in slippage mode, which can also be integrated in the controller 21. The control unit 25 is constructed such that it also regulates the operation of the electric machine 5 with the controller 21, functioning together in regulating a creep mode. For controlling and switching the possible drive modes of the hybrid electric power train 1, a central strategy unit 22 is also available, which can, advantageously, communicate through a data bus 23 (e.g. CAN) with the controller 21 and the control unit 25 as well as the other relevant control devices 13, 17, 18, 19.

The drive train 2 shown in FIG. 1 is constructed as a 2K-ISG configuration, i.e. equipped with a decoupler or starting clutch as clutch element 4 for coupling the internal combustion engine 3 to the drive train 2 and as a connection to the electric machine 5, as well as a separate second clutch element 6 located between the electric machine 5 and the transmission 7. The function of the second clutch element 6 can be replaced by a clutch element within the transmission, not shown in FIG. 1, such as one or more geared clutches and/or geared brakes of an automatic transmission.

Figure 2:
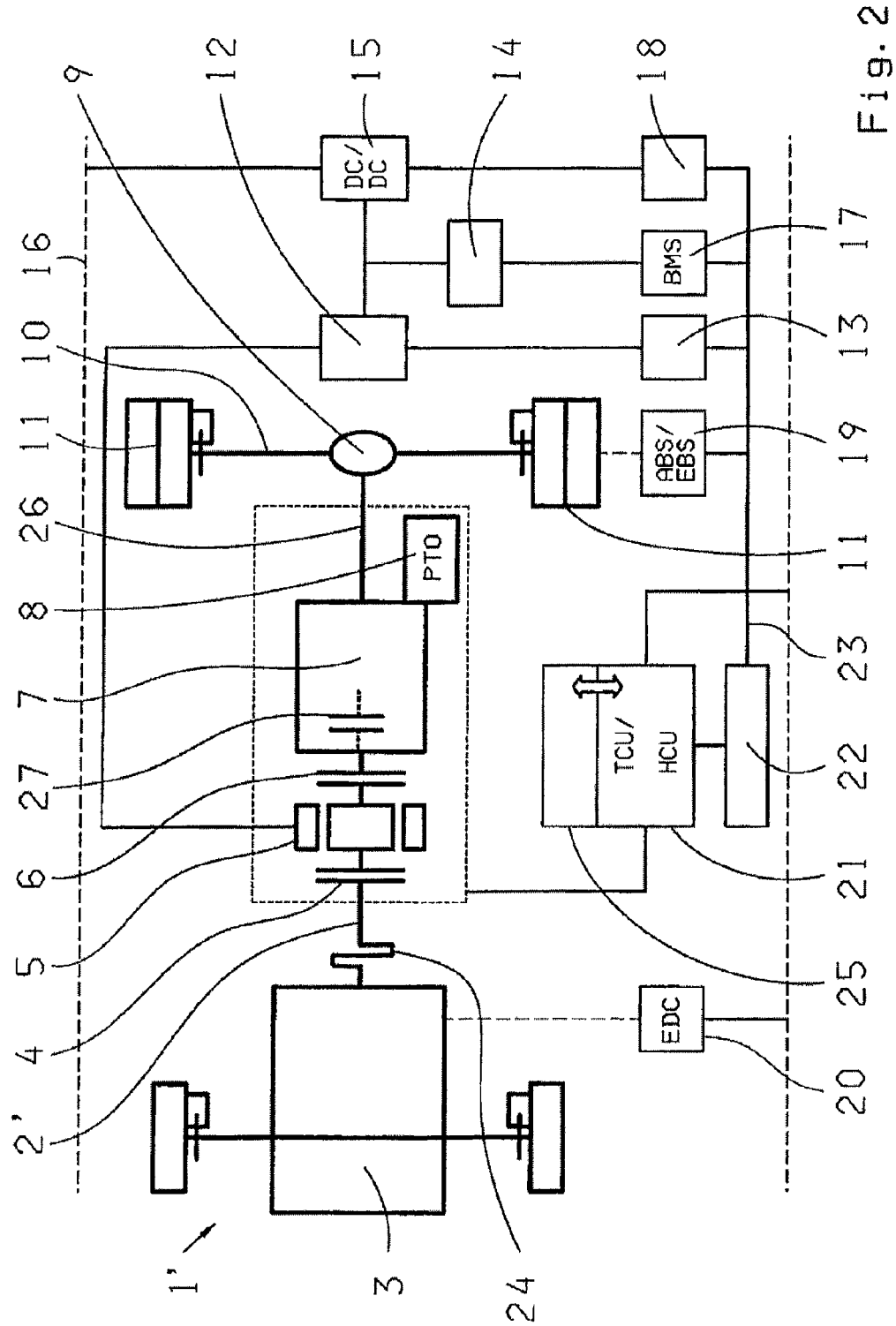

FIG. 2 shows, on the other hand, a 2K-ISG configuration of a hybrid electric power train 1' with a drive train 2' with an additional third, transmission-internal clutch element 27, which may be implemented in order to obtain a creep mode either alternating or cumulatively with the second clutch element 6. Alternatively to this, it is also possible to locate both the second clutch element 6 and the third clutch element 27 within the transmission.

A process of the invention, which can be executed with the hybrid electric power train 1, or respectively, 1' is based on a cyclically alternating internal combustion engine and electric motor creep mode in two steps, thereby on an alternating creep mode over an extended period of time using one or more friction elements 6, 27 and by means of an electric machine 5.

In a first, internal combustion engine, process step, the first friction clutch 4 is engaged; accordingly, the internal combustion engine 3 and the electric machine 5 are frictionally engaged to each other. The second clutch element 6 is operated in slippage mode, such that a desired creep torque to the output 26 is obtained via the engaged transmission 7. Furthermore, the electric machine 5 operates thereby as a generator via the internal combustion engine 3, whereby the energy storage unit 14 is charged. In the internal combustion engine creep process step, the internal combustion engine 3 delivers in this manner both power through the slipping second friction clutch 6 to the drive train of the vehicle as well as to the energy storage unit 4 via the electric machine 5.

In order to reduce the load to the second friction clutch 6, in particular in order to maintain a relatively low mid-range clutch temperature and/or in order to obtain in this phase a particularly high state of charge, or if applicable, up to the complete charging of the energy storage unit 14, the slippage mode switches to the third friction element 27 during the first process step (FIG. 2, friction clutch and/or friction brake inside the transmission), whereby the second clutch element 6 is fully engaged and the creep mode is continued by means of the appropriate activation of the third clutch element 27.

Should a predetermined state of charge for the energy storage unit 14 or a maximal acceptable temperature of the engaged clutch element 6 and/or 27 between the electric machine 5 and the output 26 be obtained, the creep mode advances to the second, electric motor process step. In this case, neither of the two clutch elements 6, 27 between the electric machine 5 and the output 26 is operated in slippage mode, such that these clutch elements 6, 27 are engaged. The first clutch element 4 is thereby opened, such that the internal combustion engine 3 is disengaged from the drive train 2, or respectively, 2'. The vehicle moves thereby solely through a respective activation of the electric machine 5 in creep mode, whereby electricity is drained from the energy storage unit 14, while the second clutch element 6 and, if applicable, the third clutch element 27 cool down. Should a lower state of charge be reached for the energy storage unit 14, the creep mode reverts to the first, internal combustion engine, process step, and so forth.

In order to slow the depletion of the energy storage unit 14, i.e. in order to extend this depletion phase, the first friction clutch 4 can be operated in slippage mode by the internal combustion engine 3, while maintaining an acceptable clutch temperature, such that the clutch 4 contributes a torque for the desired creep torque to the output 26 and the use of electric energy is thereby lower. Should an unexpected urgent need for electric energy to the internal power supply network occur, then the electric machine 5 can be switched over to the generator mode during slippage mode of the first clutch 4.

REFERENCE SYMBOL LIST 1, 1' Hybrid electric power train
2, 2' Drive train
3 Internal combustion engine
4 First clutch element
5 Electric machine
6 Second clutch element
7 Transmission
8 Power take-off
9 Differential
10 Drive shaft
11 Vehicle wheel
12 Power converter
13 Power converter control device
14 Electric energy storage unit
15 DC converter
16 Internal power supply network
17 Battery management system 18 DC converter control device
19 Electronic brake regulator
20 Electronic diesel regulator
21 Controller
22 Central strategy unit
23 Data bus
24 Crank shaft
25 Control means
26 Output
27 Third clutch element
ABS Anti-lock Braking System
BMS Battery Management System
DC/DC DC converter (Direct Current)
EBS Electronic Brake System
EDC Electronic Diesel Control
HCU Hybrid Control Unit
TCU Transmission Control Unit
PTO Power Take-Off

The invention claimed is:

1. A process for controlling a creep mode of a vehicle with a hybrid electric power train, the hybrid electric power train comprising:
   an internal combustion engine,
   an electric machine,
   a first clutch element located between the internal combustion engine and the electric machine, whereby the internal combustion engine and the electric machine are connectable with respect to each other,
   a transmission,
   an output,
   a second clutch element and a third clutch element located between the electric machine and the output, whereby the electric machine is connectable to the output;
   the process characterized in that the creep mode is obtained alternately through the means of operating at least the second clutch element and the third clutch element, alternately or in combination thereof, in slippage mode generated internal combustion engine creep mode and an, at least supported by the electric machine, electric motor creep mode.

2. The process according to claim 1, characterized in that in a creep mode extended over a period of time of the vehicle, cyclically alternating a first step and a second step, wherein the first step comprises:
   engaging the first clutch element;
   operating the electric machine as a generator driven by the internal combustion engine; and
   operating at least the second clutch element and the third clutch element, alternately or in combination in slippage mode; and
   the second step comprises:
   engaging the second clutch element or the third clutch element; and
   operating the electric machine as a motor.

3. The process according to claim 2, wherein in the second step further comprises operating the first clutch element in slippage mode.

4. The process according to claim 2, wherein the first step further comprises:
   operating the electric machine as a generator; and
   operating the first clutch element in slippage mode.

5. The process according to claim 2, wherein the electric machine connects to an electric energy storage unit, and the change between the first step and the second step occurs dependent on a state of charge in the electric energy storage unit.

6. The process according to claim 5, wherein the first step is operated when the state of charge of the energy storage unit has reached an upper threshold value.

7. The process according to claim 1, wherein the first clutch element is a friction clutch.

8. The process according to claim 1, wherein the second clutch element is a friction clutch.

9. The process according to claim 1, wherein the third clutch element is a friction clutch.

10. The process according to claim 1, wherein the transmission comprises the third clutch element.

11. The process according to claim 7, wherein the second clutch element is located between the electric machine and the transmission.

12. The process according to claim 7, wherein the transmission is located between the electric machine and the output.

13. The process according to claim 2, wherein in second step the second clutch element is engaged when the third clutch element is operating in slippage mode.

14. The process according to claim 2, wherein the second step further comprises disengaging the first clutch element.

15. A device for controlling a creep mode of a vehicle with a hybrid electric power train, the hybrid electric power train comprising:
   an internal combustion engine,
   an electric machine,
   a first clutch element located between the internal combustion engine and the electric machine, whereby the internal combustion engine and the electric machine are connectable with respect to each other,
   a transmission,
   an output,
   a second clutch element and a third clutch element located between the electric machine and the output, whereby the electric machine is connectable to the output;
   the device comprising a control means operable to alternate the creep mode either through the internal combustion engine, by means of activating at least the second clutch element and third clutch element, alternately or in combination thereof, in slippage mode, or through the electric machine, by means of engaging the second clutch element or the third clutch element.

16. The device according to claim 15, wherein the second clutch element is a friction clutch, external to the transmission, and located between the electric machine and the transmission.

17. The device according to claim 15, wherein the second clutch element and the third clutch elements are one of frictionally engaged geared clutches and geared brakes inside of the transmission.

18. The device according to claim 15, wherein the electric machine connects to an electric energy storage unit.

19. The device according to claim 15, wherein the electric machine is operable as a motor.

20. The device according to claim 15, wherein the electric machine is operable as a generator.

* * * * *

UNITED STATES PATENT AND TRADEMARK OFFICE
CERTIFICATE OF CORRECTION

PATENT NO. : 8,475,330 B2  
APPLICATION NO. : 12/747143  
DATED : July 2, 2013  
INVENTOR(S) : Kaltenbach et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this
Eighth Day of September, 2015

Michelle K. Lee
*Director of the United States Patent and Trademark Office*